United States Patent
Ichikawa et al.

(10) Patent No.: US 10,601,015 B2
(45) Date of Patent: Mar. 24, 2020

(54) BUS BAR MODULE

(71) Applicant: YAZAKI CORPORATION, Tokyo (JP)

(72) Inventors: Yoshiaki Ichikawa, Shizuoka (JP); Koji Koizumi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 584 days.

(21) Appl. No.: 15/204,692

(22) Filed: Jul. 7, 2016

(65) Prior Publication Data

US 2016/0322624 A1 Nov. 3, 2016

Related U.S. Application Data

(63) Continuation of application No. PCT/JP2015/053992, filed on Feb. 13, 2015.

(30) Foreign Application Priority Data

Feb. 14, 2014 (JP) .................... 2014-026094

(51) Int. Cl.
*H01M 2/20* (2006.01)
*H01M 2/10* (2006.01)

(52) U.S. Cl.
CPC ......... *H01M 2/206* (2013.01); *H01M 2/1077* (2013.01); *H01M 2220/20* (2013.01)

(58) Field of Classification Search
CPC . H01M 2/206; H01M 2/1077; H01M 2220/20
See application file for complete search history.

(56) References Cited

U.S. PATENT DOCUMENTS

| 8,174,831 B2* | 5/2012 | Nemesh | H05K 7/20872 |
| | | | 165/104.33 |
| 2003/0227275 A1* | 12/2003 | Kishi | H01M 10/0525 |
| | | | 320/107 |

(Continued)

FOREIGN PATENT DOCUMENTS

| JP | 2009277378 | * 11/2009 |
| JP | 2009277378 A | * 11/2009 |

(Continued)

OTHER PUBLICATIONS

International Search Report and Written Opinion of the International Search Report for PCT/JP2015/053992 dated May 19, 2015.

*Primary Examiner* — Ula C Ruddock
*Assistant Examiner* — Thomas H. Parsons
(74) *Attorney, Agent, or Firm* — Kenealy Vaidya LLP

(57) ABSTRACT

A bus bar module includes a plurality of first bus bars, a plurality of second bus bars, a resin-made case, a resin-made case, and a resin-made bridging member. The first bus bars electrically connect electrode terminals to each other in a first electrode row arranged in the same direction included in a battery assembly that is a plurality of batteries superimposed in the same direction, and electrically connect the electrode terminals of the two adjacent batteries to each other in the one electrode row. The second bus bars electrically connect electrode terminals of the two adjacent batteries to each other in a second electrode row in the battery assembly. The case holds the first bus bars. The case holds the second bus bars. The bridging member bridges these cases.

14 Claims, 4 Drawing Sheets

(56) References Cited

U.S. PATENT DOCUMENTS

| | | | |
|---|---|---|---|
| 2013/0136970 A1 | 5/2013 | Kurokawa et al. | |
| 2014/0017533 A1* | 1/2014 | Nishihara | H01M 2/06 |
| | | | 429/93 |
| 2014/0287286 A1 | 9/2014 | Miyawaki et al. | |
| 2015/0144409 A1* | 5/2015 | Fujii | B60L 11/1879 |
| | | | 180/65.1 |
| 2015/0280189 A1* | 10/2015 | Ohshiba | H01M 2/1066 |
| | | | 429/159 |

FOREIGN PATENT DOCUMENTS

| | | |
|---|---|---|
| JP | 2012-128983 A | 7/2012 |
| JP | 2013-114953 A | 6/2013 |
| JP | 2013-143272 A | 7/2013 |
| JP | 2014-182945 A | 9/2014 |
| JP | 2014-199722 A | 10/2014 |

* cited by examiner

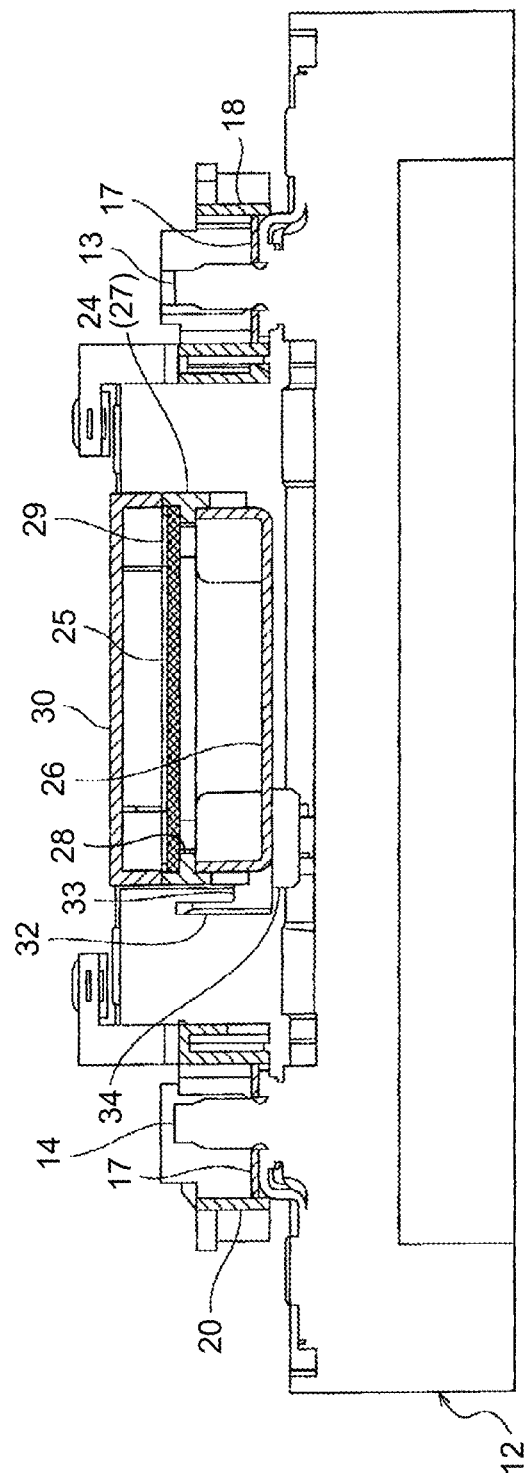

BUS BAR MODULE

CROSS-REFERENCE TO RELATED APPLICATION

This application is a continuation application of International Application PCT/JP2015/053992, filed on Feb. 13, 2015, and designating the U.S., the entire contents of which are incorporated herein by reference.

BACKGROUND OF THE INVENTION

1. Field of the Invention

The present invention relates to a bus bar module.

2. Description of the Related Art

A battery pack formed by connecting a plurality of batteries in series is mounted on an electric motor in an electric vehicle, a hybrid car, and the like. In this kind of battery pack, electrode terminals of the positive electrode and the negative electrode (hereinafter, abbreviated as positive electrode terminals and negative electrode terminals) of a plurality of batteries (battery cells) are placed adjacent to each other and alternately arranged, positive electrode terminals and negative electrode terminals of adjacent batteries are connected to each other in series through conductors referred to as bus bars so as to form a battery assembly, and the positive electrode terminals and the negative electrode terminals are housed in cases to be used as appropriate. Positive electrode terminals and the negative electrode terminals of batteries at both ends of the battery assembly become direct-current (DC) output of the battery pack. A bus bar module that holds bus bars in a resin-made holding member is attached to this battery assembly.

When this kind of battery assembly is formed in a rectangular parallelepiped shape by bundling a plurality of batteries, for example, two rows of electrode terminals (hereinafter, referred to as electrode rows) where positive electrode terminals and negative electrode terminals are alternately arranged are formed on one surface of the battery assembly. In the battery assembly, a bus bar module is mounted on each of the electrode rows, and a circuit board is disposed between a pair of bus bar modules. A circuit for monitoring temperature, voltage, and the like of each battery is mounted on this circuit board.

A chargeable secondary battery is used as a battery forming a battery pack. However, this kind of battery may generate heat during charging or discharging. When a battery generates heat and has a high temperature, circuit elements that are mounted on a circuit board disposed near the battery may be heated.

By contrast, there is disclosed a structure where a metallic duct for guiding gas discharged from a gas-venting valve of each battery to a certain position is disposed along a holding member of a bus bar and a circuit board is attached to the upper surface of the duct (see Japanese Patent Application Laid-open No. 2013-114953). In this structure, a duct is provided between a circuit board and a battery, and the circuit board can be prevented from being directly heated by heat of the battery.

However, in Japanese Patent Application Laid-open No. 2013-114953, heat generated from a battery has not been sufficiently examined, and a circuit board is attached to the upper surface of a metallic duct through which heat is easily conducted. Thus, when a duct gradually has a high temperature in association with heat generation from a battery, circuit elements mounted on a circuit board may be exposed to a high temperature.

SUMMARY OF THE INVENTION

An object of the present invention is to suppress an increase in temperature of a circuit board.

In order to achieve the above mentioned object, a bus bar module according to one aspect of the present invention includes a plurality of first bus bars configured to electrically connect electrode terminals to each other in one electrode row arranged in a same direction included in a battery assembly that is a plurality of batteries superimposed in the same direction, and electrically connect the electrode terminals of the two adjacent batteries to each other in the one electrode row; a plurality of second bus bars configured to electrically connect electrode terminals to each other in another electrode row arranged in the same direction included in the battery assembly, and electrically connect the electrode terminals of the two adjacent batteries to each other in the other electrode row; a resin-made first holding member that holds the first bus bars; a resin-made second holding member that holds the second bus bars; and a resin-made bridging member that bridges the first holding member and the second holding member, wherein the bridging member supports a circuit board that is disposed at an interval with respect to the battery assembly on a side in which each of the electrode rows is disposed on the battery assembly, and a heat shielding plate that is disposed at an interval with respect to the circuit board between the circuit board and the battery assembly.

According to another aspect of the present invention, it is desirable that the heat shielding plate is disposed by being separated from a surface of the battery assembly facing the heat shielding plate.

According to still another aspect of the present invention, it is desirable that the bridging member includes a frame-shaped supporting unit that supports the circuit board along an edge part of the circuit board, and the heat shielding plate is formed and held with the circuit board being pressed in a frame shape by the supporting unit.

According to still another aspect of the present invention, it is desirable that the heat shielding plate is a metallic plate.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a cross-sectional view along the arrows A-A of FIG. 1.

DETAILED DESCRIPTION OF THE PREFERRED EMBODIMENTS

Figure 1:
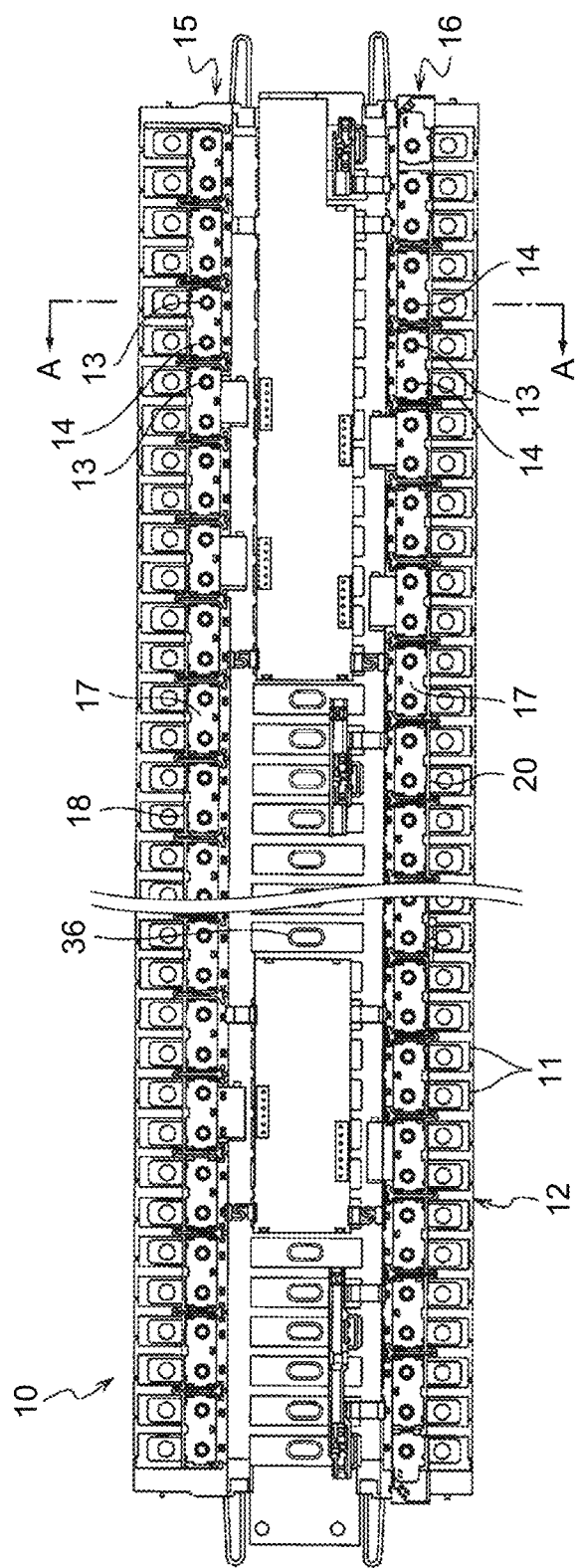
FIG. 1 is a top view illustrating a battery assembly to which a bus bar module in accordance with the present invention is attached.

An embodiment of a bus bar module according to the present invention will now be described with reference to the accompanying drawings. The bus bar module in the embodiment is used for a battery pack that is a direct-current (DC) power supply for driving an electric motor in, for example, an electric vehicle. FIG. 1 illustrates a battery pack to which a bus bar module 10 in the embodiment is attached. The battery pack is formed as a rectangular parallelepiped-shaped battery assembly 12 by each housing and arranging a plurality of batteries 11 such as lithium batteries formed in a thin rectangular parallelepiped shape in resin-made molds. The battery assembly 12 is the batteries 11 superimposed on each other in the same direction, and includes one electrode row where one electrode terminal in the batteries 11 is arranged in the same direction, and the other electrode row where the other electrode terminal in the batteries 11 is arranged in the same direction. The bus bar module 10 includes a plurality of bus bars 17 (first bus bars) as conductors that electrically connect electrode terminals to each other in the one electrode row, and a plurality of bus bars 17 (second bus bars) as conductors that electrically connect electrode terminals to each other in the other electrode row. The first bus bars illustrated as an example below electrically connect electrode terminals of two adjacent batteries 11 to each other in the one electrode row. The second bus bars illustrated as an example below electrically connect electrode terminals of two adjacent batteries 11 to each other in the other electrode row. The electrode row may be, for example, what positive electrode terminals 13 and negative electrode terminals 14 serving as electrode terminals are alternately arranged, and may be what a positive electrode group formed by the positive electrode terminals 13 arranged in the same direction and a negative electrode group formed by the negative electrode terminals 14 arranged in the same direction are alternately arranged. The electrode row may be what only electrode terminals having the same polarity are arranged. Specifically, in the batteries 11 illustrated as an example, the positive electrode terminals 13 and the negative electrode terminals 14 are placed adjacent to each other and are alternately arranged, and the positive electrode terminals 13 and the negative electrode terminals 14 of the adjacent batteries 11 are connected to each other in series through the bus bars. The number of serial connections of the batteries 11 in the battery assembly 12 is defined depending on a desirable DC voltage. In the battery pack, DC output of the battery assembly 12 corresponds to the positive electrode terminal 13 (total positive electrode) of one battery 11 and the negative electrode terminal 14 (total negative electrode) of the other battery 11 placed at both ends of the battery assembly 12.

Figure 2:
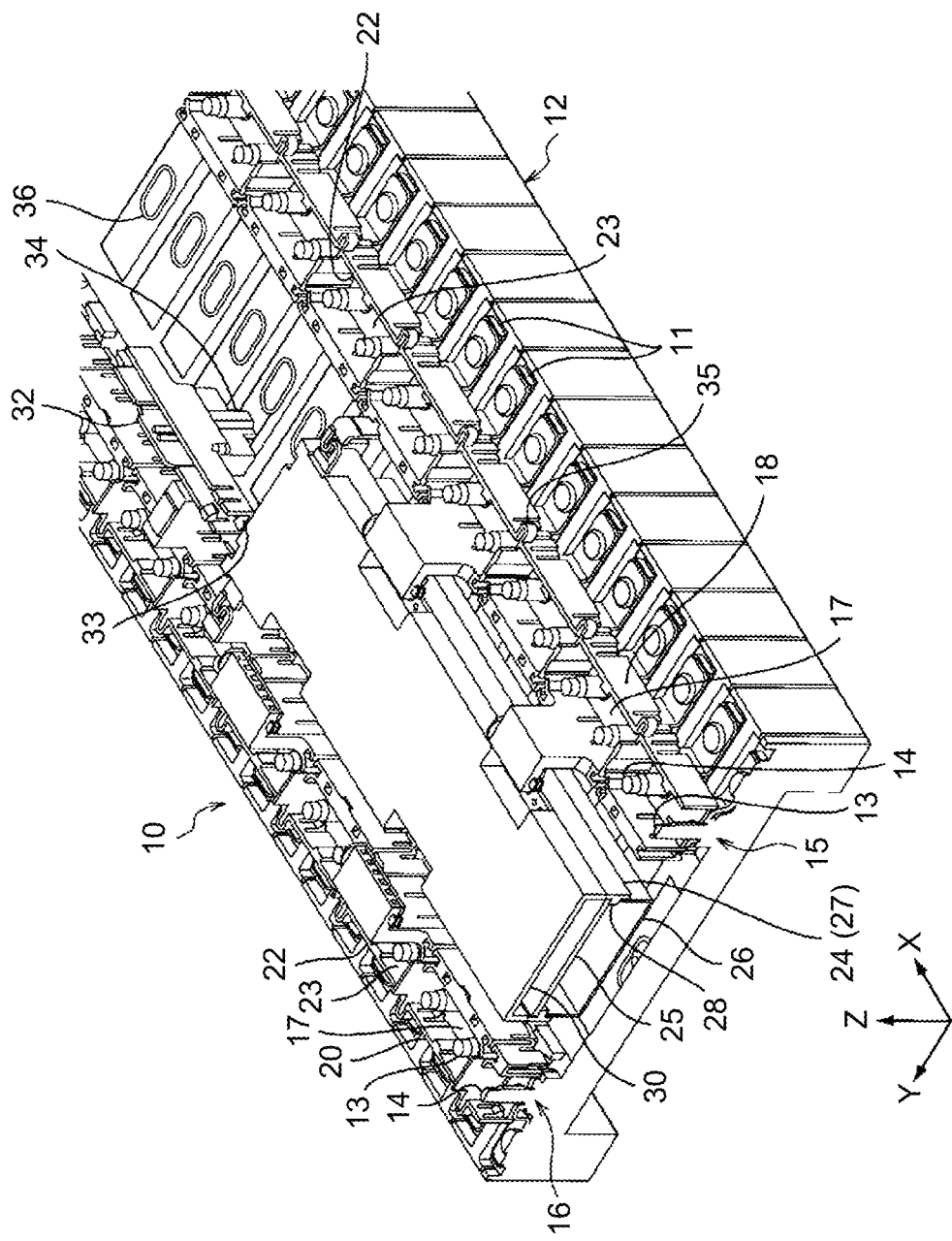
FIG. 2 is a perspective view illustrating the battery assembly to which the bus bar module is attached with a cross-sectional surface along the arrows A-A of FIG. 1 when the battery assembly is obliquely viewed.

FIG. 2 is a view illustrating the obliquely viewed battery pack with a cross-sectional surface along the arrows A-A of FIG. 1, and represents the cross-sectional surface of the bus bar module 10. An arrow X represents a first direction with respect to the batteries 11 and the battery assembly 12, and indicates an arrangement direction of the batteries 11, in other words, a longitudinal direction of the battery assembly 12. In the embodiment, the right side in FIG. 1 is defined as the rear side of the batteries 11 in the arrangement direction, and the left side is defined as the front side the of the batteries 11 in the arrangement direction. An arrow Y represents a second direction with respect to the batteries 11 and the battery assembly 12, and indicates an inter-terminal distance direction between the positive electrode terminals 13 and the negative electrode terminals 14 of the batteries 11, and a width direction of the battery assembly 12. An arrow Z represents a third direction with respect to the batteries 11 and the battery assembly 12, and indicates a height direction of each of the batteries 11 and the battery assembly 12. The first direction, the second direction, and the third direction are orthogonal to one another. Hereinafter, the upper side in FIG. 1 is defined as the upper side of the battery assembly 12. These directions are applied to the description of all drawings.

Each of the batteries 11 has the column-shaped positive electrode terminal 13 and negative electrode terminal 14 projecting from a side surface (upper surface) of the battery 11 disposed thereon. Screws are formed on the outer surface of these electrode terminals (positive electrode terminals 13 and negative electrode terminals 14). The battery assembly 12 has two electrode rows where the positive electrode terminals 13 and the negative electrode terminals 14 are alternately arranged along the arrangement direction of the batteries 11, in other words, a first electrode row 15 and a second electrode row 16 arranged thereon. These electrode rows 15 and 16 are separated in the width direction of the battery assembly 12, and are arranged substantially in parallel to each other.

The bus bar module 10 in the embodiment includes a resin-made case 18 (first holding member) that holds therein the bus bars 17 (first bus bars), and a resin-made case 20 (second holding member) that holds therein the bus bars 17 (second bus bars). The bus bars 17 held in the case 18 connect the adjacent positive electrode terminals 13 and negative electrode terminals 14 to each other in the first electrode row 15. The bus bars 17 held in the case 20 connect the adjacent positive electrode terminals 13 and negative electrode terminals 14 to each other in the second electrode row 16. The case 18 is attached along the first electrode row 15 of the battery assembly 12. The case 20 is attached along the second electrode row 16 of the battery assembly 12.

Figure 3:
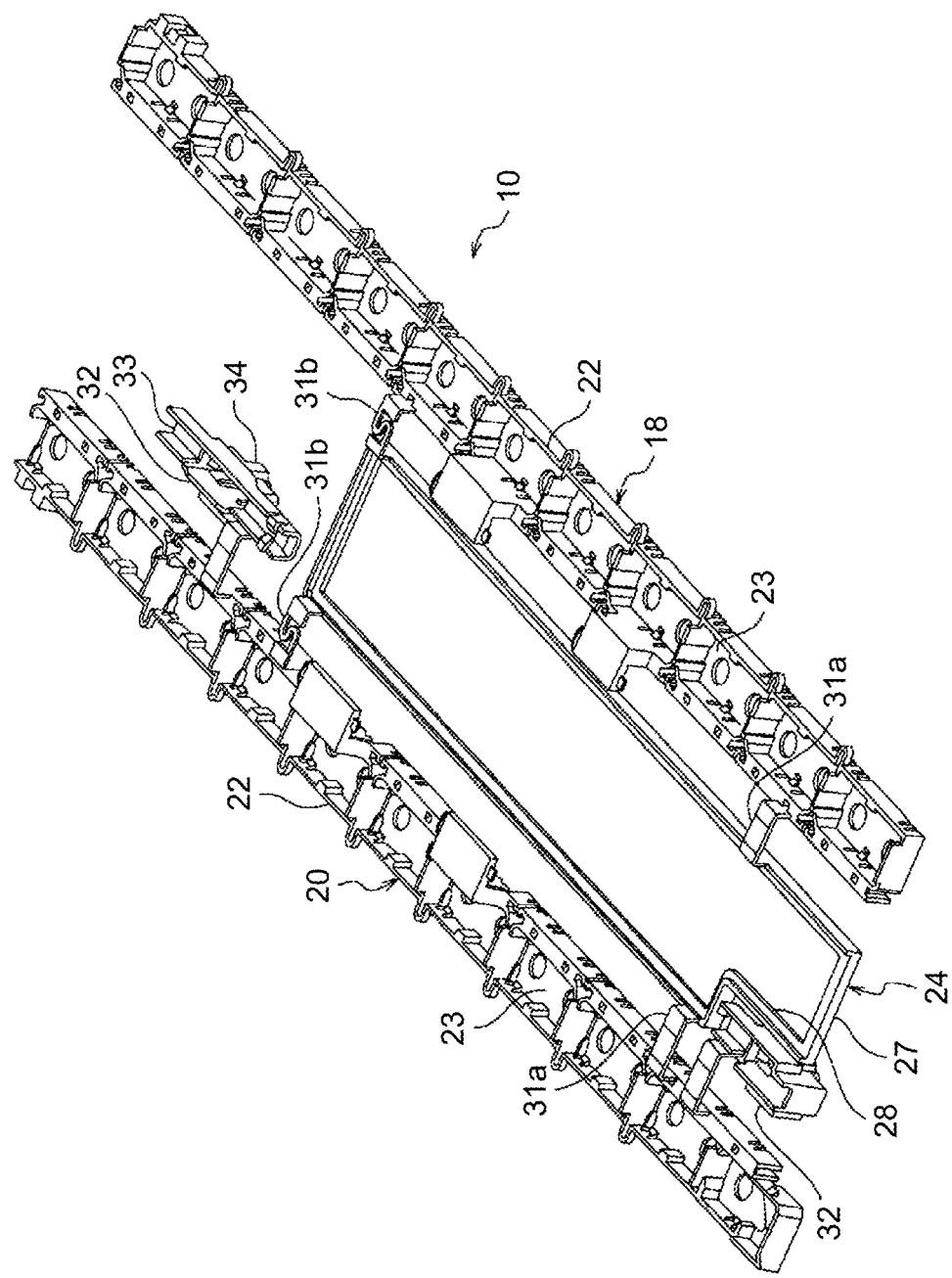
FIG. 3 is a partial perspective view illustrating an enlarged bridging member of the bus bar module in accordance with the present invention.

Each of the cases 18 and 20 includes a plurality of surrounding walls 22 each rising in a cylindrical shape from the bottom surface (FIGS. 2 and 3). These surrounding walls 22 are arranged by being arranged with each other along the longitudinal direction of the battery assembly 12. A housing chamber 23 is formed inside each of the surrounding walls 22. The bus bars 17 are superimposed and held one by one in each of the housing chambers 23. A pair of holes is perforated into each of the bus bars 17 in conformity with the position of the positive electrode terminal 13 and the negative electrode terminal 14 of the adjacent batteries 11. When the bus bar module 10 is mounted on the battery assembly 12, electrode terminals are inserted into holes of the bus bar 17 held in each of the housing chambers 23 and holes of terminals, and a nut is screwed to each of the electrode terminals so as to fasten each of the bus bars 17 to each of the electrode terminals. In this manner, the bus bar module 10 is fixed to the battery assembly 12.

The bus bar module 10 is formed by ranging each of the cases 18 and 20 with each other through a plurality of resin-made bridging members 24. The bridging members 24 support a circuit board 25 and a heat shielding plate 26. The circuit board 25 is formed in a rectangular shape, and a plurality of holes in which screws are inserted are perforated into the circuit board 25. This circuit board 25 has circuit elements and the like for monitoring temperature, voltage, and the like of each of the batteries 11 and detecting abnormality of the batteries 11 mounted thereon. The circuit elements are mounted on at least one of the upper surface and the lower surface of the circuit board 25. The heat shielding plate 26 is formed by applying press work and the like to a metallic plate material. The heat shielding plate 26 is formed by raising both edges of a rectangular-shaped bottom surface in the width direction so as to form a cross-sectional surface into a recessed shape. A flange into which a plurality of holes for screws are perforated, which is not illustrated, is formed on the upper end part of the raised both edges. The heat shielding plate 26 is formed in a size including a projection area of a mounting surface of the circuit board 25 on the batteries 11 side when viewed from the batteries 11 side. The heat shielding plate 26 is interposed between the battery assembly 12 and the circuit board 25. The heat shielding plate 26 can be formed of a ceramic-made plate, a metallic plate, and the like, but the heat shielding plate 26 is preferably formed of metal in view of excellent workability and reduction in manufacturing cost.

FIG. 3 illustrates the whole image of the bus bar module 10, and FIG. 4 illustrates a cross-sectional surface of the bus bar module 10 attached to the battery assembly 12. As illustrated in FIG. 3, the bridging member 24 includes a supporting unit 27 that is a rectangular-shaped frame body. This supporting unit 27 includes an extending unit 28 projecting in a stepped shape from the vicinity of a center in the height direction to the inside, and has its cross-sectional surface formed in a T shape (FIGS. 2 and 4). In other words, in the bridging member 24, the circuit board 25 and the heat shielding plate 26 are fitted into the inside of the supporting unit 27 so as to sandwich the extending unit 28 between the circuit board 25 and the heat shielding plate 26. In this manner, the circuit board 25 and the heat shielding plate 26 are fixed to the supporting unit 27 by inserting a screw 29 into a hole in the circuit board 25 and a hole in the flange of the heat shielding plate 26, and fastening this screw 29. The heat shielding plate 26 is to be held with the circuit board 25 being pressed in a frame shape along the edge part of the circuit board 25.

A resin-made lid 30 is attached to the supporting unit 27 from the upper side. This lid 30 is formed by vertically suspending both edges of a rectangular-shaped top plate in the horizontal direction (second direction) so as to form its cross-sectional surface into a recessed shape. The lid 30 is held by the supporting unit 27 by engaging a locking unit projecting on the lower side with a locking projection formed on the supporting unit 27. The locking unit and the locking projection are not illustrated. In this manner, the supporting unit 27 is covered with the lid 30 so as to prevent a foreign matter from sticking to the circuit board 25.

As illustrated in FIG. 4, the circuit board 25 and the lid 30 are provided by separating their facing surfaces from each other. The circuit board 25 and the heat shielding plate 26 are provided by separating their facing surfaces from each other. In other words, the circuit board 25 is housed in a rectangular parallelepiped-shaped space formed by the lid 30, the heat shielding plate 26, and the bridging member 24 (supporting unit 27). Spaces each having a rectangular-shaped cross-sectional surface are formed between the circuit board 25 and the lid 30, and between the circuit board 25 and the heat shielding plate 26. The size of these spaces is defined as the size where the circuit elements projecting from the mounting surface of the circuit board 25 are at least disposed without contact.

As illustrated in FIG. 3, the bridging member 24 is formed by being arranged with each of the cases 18 and 20 with a plurality of connecting units 31 extending from the supporting unit 27. In other words, the bridging member 24 is integrally formed with each of the cases 18 and 20, and is supported from both sides by each of the cases 18 and 20. First connecting units 31a formed of a plate member, and second connecting units 31b meandering and extending, for example, in an S shape in the arrangement direction of the batteries 11 are formed between the supporting unit 27 and each of the cases 18 and 20. The first connecting units 31a support the bridging member 24 with relatively high strength. By contrast, in the second connecting units 31b, a part meandering in the arrangement direction of the batteries 11 is expandable and contractable in the arrangement direction.

A plurality of electric wires connected to terminals held in the housing chambers 23 in each of the cases 18 and 20 are wired, for example, along electric wire housing grooves 33 of electric wire holding members 32 extending along the upper surface of the battery assembly 12 from the side surface of each of the cases 18 and 20, and after that, are electrically connected to the circuit elements of the circuit board 25. In each of the electric wire holding members 32, a support pillar 34 projecting on the lower side contacts the upper surface of the battery assembly 12. In other words, each of the electric wire housing grooves 33 is to be supported by the support pillar 34.

The bus bar module 10 in the embodiment formed in this manner is attached to the battery assembly 12 by integrating the circuit board 25, the heat shielding plate 26, and the lid 30 with the bridging members 24. As illustrated in FIG. 4, the bridging member 24 is disposed by being separated from the upper surface of the battery assembly 12 that the heat shielding plate 26 faces.

As described above, in the embodiment, the heat shielding plate 26 is provided between the circuit board 25 and the batteries 11 side facing the circuit board 25. The resin-made supporting unit 27 having low heat conductivity is interposed between the circuit board 25 and the heat shielding plate 26. Furthermore, the circuit board 25 is surrounded by the heat shielding plate 26, the supporting unit 27, and the lid 30. Thus, when the batteries 11 generate heat, in any form of convection, heat conduction, and heat radiation, the heat of the batteries 11 can be prevented from being conducted to the circuit board 25, and functional deterioration in the circuit elements due to heating can be prevented. For example, when gas is discharged from gas-venting valves 36 (FIGS. 1 and 2) of the batteries 11, it is considered that the heat shielding plate 26 disposed facing the valves 36 may be exposed to a high temperature. However, the bus bar module 10 in the embodiment can suppress an increase in temperature of the heat shielding plate 26, and can prevent an increase in temperature of the circuit board 25 because a space is formed between the heat shielding plate 26 and the batteries 11, and a space is formed between the heat shielding plate 26 and the circuit board 25.

In the embodiment, because the heat shielding plate 26 is disposed by being separated from the side surface of the facing batteries 11 (in other words, the surface of the battery assembly 12 facing the heat shielding plate 26), heat can be prevented from being directly conducted from the surface of the batteries 11 to the heat shielding plate 26. In addition, for example, a flow channel for guiding gas discharged from the valves 36 to a certain position can be formed between the heat shielding plate 26 and the batteries 11. In this manner, an increase in temperature of the heat shielding plate 26 can be suppressed, and the circuit board 25 suppresses influence of heat on not only a board surface on the upper surface side but also a board surface on the lower surface side (batteries 11 side), so as to enable the mounting on both sides of the circuit board 25. The bus bar module 10 in the embodiment can thus enhance design flexibility of a circuit on the circuit board 25.

In the embodiment, the heat shielding plate 26 is held by the supporting unit 27 with the edge part of the board surface of the circuit board 25 being pressed in a frame shape along the edge part. Thus, a shape of the circuit board 25 can be held by the heat shielding plate 26 having high rigidity. In this manner, the bus bar module 10 in the embodiment can prevent deformation of the circuit board 25 such as buckle and distortion. In the embodiment, the heat shielding plate 26 is formed of metal, so as to protect the circuit elements of the circuit board 25 from, for example, noise generated from each of the batteries 11, electric wires, and the like. The heat shielding plate 26 can also be formed of a material having heat-shielding effect other than metal.

In the embodiment, the circuit board 25 is mounted on the bus bar module 10, so as to handle them as one component. Thus, operation efficiency can be enhanced, especially when the bus bar module 10 is mounted on the battery assembly 12.

Expansion and contraction of the batteries 11 are repeated due to changes in temperature before and after heat generation. Relatively large dimensional changes may occur in, especially the battery assembly 12 in the longitudinal direction. On this point, in the embodiment, because the adjacent surrounding walls 22 in the each of the cases 18 and 20 are connected to each other through hinges 35 (FIG. 2), the cases 18 and 20 are expandable and contractable in the longitudinal direction in conformity with expansion and contraction of the batteries 11. The bridging members 24 are formed by being arranged with each other between each of the cases 18 and 20 through the first connecting units 31a and the second connecting units 31b. The second connecting units 31b extend and contract in conformity with expansion and contraction of the cases 18 and 20. In this manner, the bus bar module 10 in the embodiment can maintain a shape and a dimension of the supporting unit 27 holding the circuit board 25 even when the cases 18 and 20 repeat expansion and contraction due to expansion and contraction of the batteries 11. Thus, the bridging members 24 can be prevented from being damaged, and the circuit board 25 can be reliably held. In addition, even when variation occurs in intervals between the positive electrode terminals 13 and the negative electrode terminals 14 of the batteries 11, the variation can be absorbed by the expansion and contraction action of the second connecting units 31b, and the bus bar module 10 can be mounted on the batteries 11 where the variation occurs. In this manner, this bus bar module 10 can be mounted on the battery assembly 12, so as to improve mounting workability.

As above, the embodiment according to the present invention has been described in detail with reference to the drawings, but the embodiment is merely an example of the present invention and the present invention is not limited to only the configuration of the embodiment. If modifications and the like are made on design without departing from the gist of the present invention, as a matter of course, the modifications and the like are included in the present invention.

For example, the bridging members 24 in the embodiment are integrally formed with each of the cases 18 and 20, however, if the bridging members 24 are formed to be capable of bridging each of the cases 18 and 20, the integral forming is not limiting. In other words, for example, the bridging members 24 are formed as a separated component from each of the cases 18 and 20, and can be formed to be connectable to each of the cases 18 and 20.

According to the present invention, an increase in temperature of a circuit board can be suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A bus bar module comprising:
a plurality of first bus bars configured to electrically connect electrode terminals to each other in one electrode row arranged in a same direction included in a battery assembly that is a plurality of batteries superimposed in the same direction, and electrically connect the electrode terminals of the two adjacent batteries to each other in the one electrode row;
a plurality of second bus bars configured to electrically connect electrode terminals to each other in another electrode row arranged in the same direction included in the battery assembly, and electrically connect the electrode terminals of the two adjacent batteries to each other in the other electrode row;
a resin-made first holding member that holds the first bus bars;
a resin-made second holding member that holds the second bus bars;
a resin-made bridging member that bridges the first holding member and the second holding member;
a circuit board; and
a heat shielding plate, wherein
the bridging member includes a first side that faces away from the battery assembly and a second side that faces toward the battery assembly, the circuit board is supported on and engages the first side of the bridging member, and the heat shielding plate is supported on and engages the second side of the bridging member such that the bridging member supports the circuit board at a position that is spaced away from the battery assembly, and the bridging member supports the heat shielding plate at a position that is between the circuit board and the battery assembly.

2. The bus bar module according to claim 1, wherein the heat shielding plate is disposed by being separated from a surface of the battery assembly facing the heat shielding plate.

3. The bus bar module according to claim 2, wherein the bridging member includes a frame-shaped supporting unit that supports the circuit board along an edge part of the circuit board, and
the heat shielding plate is formed and held with the circuit board being pressed in a frame shape by the supporting unit.

4. The bus bar module according to claim 2, wherein the heat shielding plate is a metallic plate.

5. The bus bar module according to claim 1, wherein the bridging member includes a frame-shaped supporting unit that supports the circuit board along an edge part of the circuit board, and
the heat shielding plate is formed and held with the circuit board being pressed in a frame shape by the supporting unit.

6. The bus bar module according to claim 5, wherein the heat shielding plate is a metallic plate.

7. The bus bar module according to claim 1, wherein the heat shielding plate is a metallic plate.

8. The bus bar module according to claim 1, wherein the circuit board, the heat shielding plate, and the bridging member form a space therebetween.

9. The bus bar module according to claim 1, wherein the heat shielding plate is suspended from the bridging member.

10. The bus bar module according to claim 1, wherein the heat shielding plate is mounted on the bridging member.

11. The bus bar module according to claim 1, wherein the bridging member includes a supporting member, a first connecting member, and a second connecting member, a first space extends between the supporting member and the first holding member, a second space extends between the supporting member and the second holding member, the first connecting member spans the first space and is connected to each of the supporting member and the first holding member, and the second connecting member spans the second space and is connected to each of the supporting member and the second holding member.

12. The bus bar module according to claim 1, wherein the bridging member includes a frame-shaped supporting member that encircles a first space, the circuit board abuts the frame-shaped supporting member and closes one side of the first space, and the heat shielding plate abuts the frame-shaped supporting member and extends around a second space that extends from the heat shield to the first space, and the second space is in communication with the first space.

13. The bus bar module according to claim 1, wherein the heat shielding plate engages and extends away from the bridging member.

14. The bus bar module according to claim 1, wherein the heat shielding plate is spaced away from the battery assembly when the bus bar module is mounted to the battery assembly.

* * * * *